Patented Sept. 27, 1932

1,879,390

UNITED STATES PATENT OFFICE

HANS MILDNER, OF LEVERKUSEN-ON-THE-RHINE, GERMANY, ASSIGNOR TO GENERAL ANILINE WORKS INC., OF NEW YORK, N. Y., A CORPORATION OF DELAWARE

PROCESS OF PREPARING QUINIZARINE SULPHONIC ACIDS

No Drawing. Application filed March 14, 1929, Serial No. 347,177, and in Germany March 22, 1928.

The present invention relates to a process of preparing quinizarine sulphonic acids.

In accordance with the invention the technically valuable quanizarine sulphonic acids of the formula:—

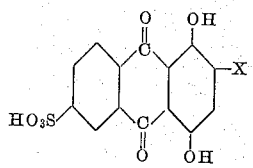

wherein X stands for hydrogen or an alkyl group, are obtainable in an excellent purity and without the formation of by-products by heating the boric acid esters of the corresponding non-sulphonated quinizarine compounds in fuming sulphuric acid, with or without the addition of small amounts of mercury or a salt thereof, such as mercuric sulphate, mercuric chloride and the like. I prefer to perform the reaction with a fuming sulphuric acid of about 10–40% strength and at temperatures between about 140–200° C. The boric acid esters above mentioned can be manufactured for example according to the method described by Dimroth (Ber. 54, 3031), or by treating the unsulphonated quinizarine compounds with boric acid in fuming sulphuric acid according to known methods. In this latter case it is not necessary to isolate the boric acid esters, but sulphonation may be performed by heating the reaction mass to the temperatures above mentioned, advantageously after the addition of a small amount of mercury or a salt thereof.

The following examples illustrate my invention without limiting it thereto.

Example 1

The boric acid ester of quinizarine is produced from 2 parts by weight of quinizarine and 1 part by weight of crystallized boric acid in 10 parts by weight of fuming sulphuric acid of about 20% at 90–100° C. After the formation of the boric acid ester is complete, 10 parts by weight of fuming sulphuric acid of 65% are added. The fuming sulphuric acid present has then a strength of about 30%, for in the first step of the reaction, that is, during the formation of the boric acid ester, water is set free and bound by the fuming sulphuric acid of 20% strength to form monohydrate. The mixture is heated to about 170–180° C. after the addition of about 0.05 parts of mercuric sulphate, until a sample is soluble in water. Then the reaction mass is poured into water and the quinizarine-6-sulphonic acid obtained is separated by salting out. It forms in the form of its sodium salt red crystals easily soluble in water, soluble in strong sulphuric acid with a yellow-red coloration.

Example 2

2-methyl-quinizarine is converted into the boric acid ester and the latter is heated with fuming sulphuric acid as described in Example 1. The resulting 2-methyl-quinizarine-suphonic acid is separated from the aqueous solution of the sulphonation mixture by salting out. The properties of the compound are similar to those of quinizarine-6-sulphonic acid.

I claim:—

1. The process which comprises reacting upon the boric acid ester of a compound of the general formula:—

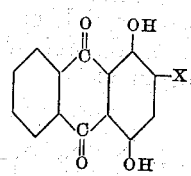

wherein X stands for hydrogen or an alkyl group, with fuming sulphuric acid of about 10–40% strength at a temperature of about 140–200° C.

from a work piece to give it the contour of a templet, said machine having work holding means, a reducing tool, and feeding mechanism for effecting a relative transverse movement between the work holding means and the tool to cause the latter to reduce the size of the work piece carried by the holding means; the combination of an electromagnet operatively associated with said feeding mechanism for controlling its rate of operation, a Wheatstone bridge having a movable coil connected in one of its arms, a movable magnetic member adjacent to said coil to function as a part of its magnetic circuit, a movable gauging member, means for effecting two relative longitudinal movements whose velocities are substantially directly proportional to each other, one of said longitudinal movements being between the tool and the work piece surface, and the other longitudinal movement being between the gauging member and the surface of the templet to be simulated, means for transversely moving said gauging member towards and into continual contact with the templet surface, a second movable gauging member, means for transversely moving the second gauging member in response to the relative transverse movement between the work holding means and the tool, means for transmitting the transverse movement of one gauging member to said coil, means for transmitting the transverse movement of the other gauging member to said magnetic member, electroresponsive means on which is impressed a voltage whose magnitude is responsive to the difference of potential across the Wheatstone bridge, caused by an unbalance thereof, and means responsive to the operation of said electroresponsive means for effecting the operation of said electromagnet when the contour of the work piece surface varies appreciably from the contour of the templet surface.

In witness whereof, I have hereunto set my hand.

ALFRED V. MERSHON.